(12) United States Patent
Nakamoto et al.

(10) Patent No.: US 8,569,444 B2
(45) Date of Patent: Oct. 29, 2013

(54) POLYALKYLENE GLYCOL DERIVATIVE AND PROCESS FOR PRODUCING SAME

(75) Inventors: Ken-ichiro Nakamoto, Kanagawa (JP); Chika Itoh, Kanagawa (JP); Shuichi Yoshimura, Kanagawa (JP); Tsuyoshi Takehana, Kanagawa (JP)

(73) Assignee: NOF Corporation, Tokyo (JP)

( * ) Notice: Subject to any disclaimer, the term of this patent is extended or adjusted under 35 U.S.C. 154(b) by 185 days.

(21) Appl. No.: 13/128,470

(22) PCT Filed: Nov. 11, 2009

(86) PCT No.: PCT/JP2009/069223
§ 371 (c)(1),
(2), (4) Date: May 10, 2011

(87) PCT Pub. No.: WO2010/055866
PCT Pub. Date: May 20, 2010

(65) Prior Publication Data
US 2011/0218322 A1 Sep. 8, 2011

(30) Foreign Application Priority Data
Nov. 11, 2008 (JP) ................. 2008-288781

(51) Int. Cl.
*C08G 59/68* (2006.01)
*C08G 65/34* (2006.01)
*C08G 59/00* (2006.01)
*C08G 65/00* (2006.01)

(52) U.S. Cl.
USPC ........... 528/409; 528/425; 528/488; 528/495; 528/497; 528/502 R; 528/503

(58) Field of Classification Search
USPC ...... 528/425, 488, 495, 497, 502 R, 503, 409
See application file for complete search history.

(56) References Cited

U.S. PATENT DOCUMENTS

| 2002/0120075 A1 | 8/2002 | Yasukohchi et al. |
| 2004/0242450 A1 | 12/2004 | Itoh et al. |
| 2006/0074200 A1 | 4/2006 | Daugs et al. |

FOREIGN PATENT DOCUMENTS

| JP | 11-335460 A | 12/1999 |
| JP | 2000-344883 A | 12/2000 |

(Continued)

OTHER PUBLICATIONS

International Search Report (PCT/ISA/210) issued in PCT/JP2009/069223, on Jan. 19, 2010.

(Continued)

*Primary Examiner* — Duc Truong
(74) *Attorney, Agent, or Firm* — Sughrue Mion, PLLC

(57) ABSTRACT

A process for producing a polyalkylene glycol derivative having such high molecular weight and purity that the derivative can be used in pharmaceutical applications, which produces a polyalkylene glycol derivative of the formula (X) by steps (A), (B), (C) and (D), wherein R is as defined:

R—(OA)$_n$OH (X)

(step (A)) 5 to 50% by mol of an alkali catalyst is added to a compound represented by the formula (Y), wherein R is as defined:

R—OH (Y)

(step (B)) an alkylene oxide having 2 to 4 carbon atoms is reacted under a condition of 50 to 130° C. until the average number of moles of an oxyalkylene group OA added reaches the range of 5 to 500 to obtain a polyalkylene glycol derivative;

(step (C)) 10 to 5000% by mass of a hydrocarbon solvent is added to the derivative of the step (B) to dilute it, and remaining water is removed by azeotropy; and (step (D)) the derivative of the step (B) is reacted with an alkylene oxide having 2 to 4 carbon atoms under a condition of 50 to 130° C. until the average number of moles of the oxyalkylene group (OA) reaches the range of 600 to 2000.

16 Claims, 1 Drawing Sheet

(56) References Cited

FOREIGN PATENT DOCUMENTS

| JP | 2005-306947 A | 11/2005 |
| JP | 2006-069975 A | 3/2006 |
| JP | 2008-007731 A | 1/2008 |
| JP | 2008-514763 A | 5/2008 |

OTHER PUBLICATIONS

Written Opinion (PCT/ISA/237) issued in PCT/JP2009/069223, on Jan. 19, 2010.

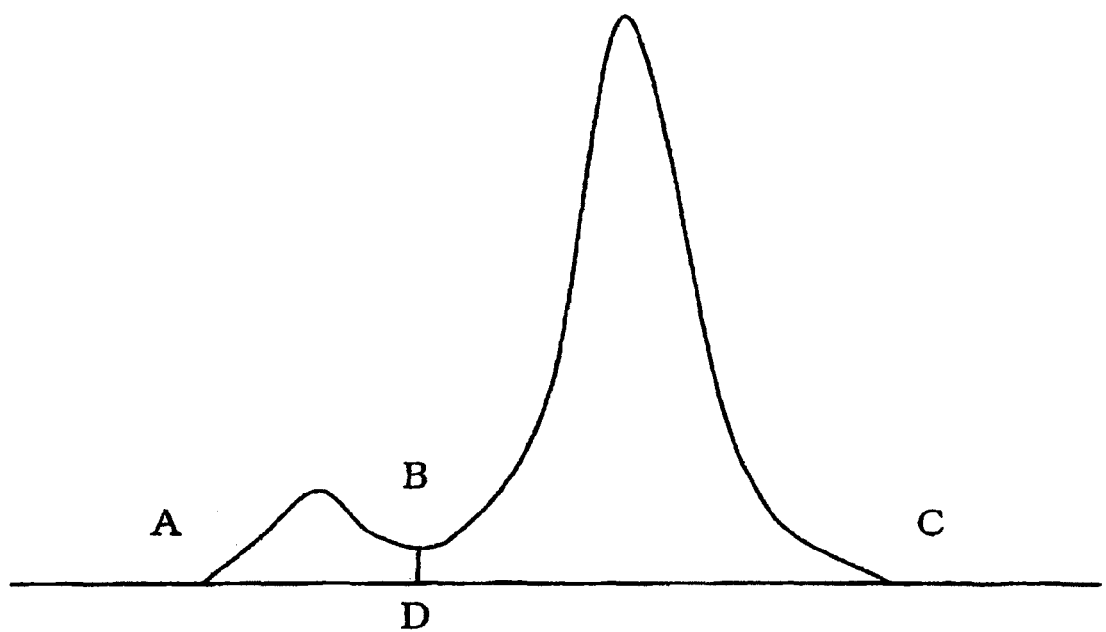

__US 8,569,444 B2__

POLYALKYLENE GLYCOL DERIVATIVE AND PROCESS FOR PRODUCING SAME

TECHNICAL FIELD

The present invention relates to a process for producing a polyalkylene glycol derivative having high molecular weight and high purity.

BACKGROUND ART

Recently, a large number of proteins, polypeptides, synthetic compounds, and compounds extracted from natural resources having physiological activity have been found out and the application thereof to pharmaceuticals has been extensively studied. However, these physiologically active substances have short half-lives in blood when they are administrated to a living body and hence it is difficult to obtain a sufficient pharmacological effect. This is because the physiologically active substances administrated to a living body are usually cleared from the living body because of the filtration through glomeruli in the kidney and the uptake by macrophages in the liver, spleen, and the like. Therefore, it is attempted to improve the behavior in a living body by encapsulating these physiologically active substances in liposomes or polymer micelles or increasing their molecular weight through chemical modification with a polyalkylene glycol derivative which is an amphiphatic polymer. A polyalkylene glycol exhibits a low interaction with the other bio-components owing to its steric repulsion effect and as a result, proteins and polypeptides such as enzymes modified with a polyalkylene glycol derivative exhibit an effect of avoiding the filtration through glomeruli in the kidney and bio-reactions such as immunoreaction, so that they achieve half-lives in blood longer than those of unmodified substances. It is known that this effect is larger when the molecular weight of the polyalkylene glycol is higher. Moreover, they also have decreased toxicity and antigenicity and further exhibit an effect of enhancing the solubility of a sparingly water-soluble compound having a high hydrophobicity.

Thus, a polyalkylene glycol and a polyalkylene glycol derivative obtained by introducing a reactive group into the polyalkylene glycol have been important materials indispensable in the field of drug delivery systems. Because of pharmaceutical applications, a polyalkylene glycol derivative containing a particularly small amount of impurities and having high purity have been demanded. Moreover, since improvement in half-lives in blood is more expectable as the molecular weight increases, high-molecular-weight one having a molecular weight of 30000 or more has been recently demanded. Based on such backgrounds, a production technology capable of producing a polyalkylene glycol derivative having high purity and high molecular weight has been strongly desired.

As an impurity contained in a polyalkylene glycol derivative, a diol compound having two hydroxyl groups and having a molecular weight double the molecular weight of the objective compound may be first mentioned. Usually, at the production of a polyalkylene glycol derivative having one hydroxyl group, the derivative can be obtained by addition polymerization of an alkylene oxide using a corresponding alcohol as an initiator and an alkali catalyst. On this occasion, in the case where water is present in the reaction system including the starting materials and a reaction vessel, the alkylene oxide adds and polymerizes to the water molecule and as a result, the diol compound having the hydroxyl groups at both ends and having a molecular weight double the molecular weight of the objective compound is produced as a by-product. Since the diol compound is a polyalkylene glycol the same as the objective compound, they closely resemble each other in physical properties and hence separation and purification are difficult, particularly industrial separation and purification are difficult. In the case where a polyalkylene glycol derivative containing a large amount of the diol compound is subjected to introduction of a reactive group and activation and then reacted with a physiologically active substance such as a protein, the reactive group is introduced into both ends of the impurity diol compound, so that an impurity where the physiologically active substance is introduced into the both ends is produced as a by-product and thus the quality of the resulting pharmaceutical is deteriorated.

For such a reason, control of water content in the reaction system is very important in order to obtain a highly pure polyalkylene glycol derivative containing a lesser amount of the diol compound. Particularly, in the case of producing a high-molecular-weight compound having a molecular weight of more than 30000, a difference in molecular weight between the objective compound and the initiator becomes large, so that the amount of the initiator alcohol to be charged into the reaction vessel becomes small. For example, in the case where the initiator is methanol, the amount of the initiator to be charged is 0.1% by mass or less based on the objective compound and hence there are problems that stirring in the reaction vessel is difficult and as the amount to be charged decreases, the influence of mixed water increases to result in production of a large amount of the diol compound as a by-product. Moreover, the water in the system can be removed under reduced pressure after the starting material alcohol and a catalyst are charged into the reaction vessel but, particularly in the case where the boiling point of the initiator alcohol is close to that of water or in the case where the boiling point is lower than that of water, the starting material initiator also vaporizes together with the water at the operation of dehydration, so that the production of the objective compound has been found to be difficult.

As a process for synthesizing a highly pure polyalkylene glycol derivative, Patent Document 1 proposes a process for producing an oxirane derivative. In the production process, attention is paid on the aforementioned water content in the reaction system but there is no suggestion on the production of a high-molecular-weight compound and no specific examples exist.

Moreover, with regard to the problem that the amount of the initiator alcohol becomes small, Patent Document 2 proposes a production process with diluting the alcohol with an ether solvent beforehand. In this process, the problem relating to stirring is solved but, on the other hand, the problem relating to the water derived from the ether solvent used for dilution is not solved. With regard to the diluting solvent, it is charged to the reaction vessel after dehydration using a column of active alumina, a column of molecular sieves, or the like. However, since the operation of dehydration of the diluting solvent using such a column generally requires a long period of time and also requires a dedicated equipment, the process is suitable for small-scale production but is not suitable for industrial production. Furthermore, as the molecular weight of the objective compound becomes high, the amount of the initiator becomes small, so that the influence of the water mixed in a minute amount increases on the initiator in a molar ratio even when the dehydration is performed by the column operation as described above and as a result, the content of the diol compound derived from the water increases. Particularly in recent years, in the field of the drug delivery systems, a high-molecular-weight compound having a molecular weight of more than 30000 is demanded from the viewpoint of improving the circulation in blood. In the process of Patent Document 2, the diol compound is liable to be produced as a by-product at the production of the high-molecular-weight compound.

BACKGROUND ART DOCUMENTS

Patent Documents

Patent Document 1: JP-A-11-335460
Patent Document 2: US2006/0074200 A1

SUMMARY OF THE INVENTION

Problems that the Invention is to Solve

Moreover, it is known that an ether solvent is generally liable to form a peroxide. During addition polymerization of an alkylene oxide, the peroxide is not formed since the reaction system is alkaline but, on the neutralization step and later steps after the addition reaction of the alkylene oxide, the peroxide is formed through the contact with oxygen and also oxidation of the polyalkylene glycol derivative takes place. In the case where the polyalkylene glycol derivative undergoes oxidation, there is a possibility that deterioration of polydispersity and production of a low-molecular-weight aldehyde as a by-product take place and the compound is mixed into pharmaceuticals as an impurity, so that the case is not preferred. In the case where the polyalkylene glycol derivative is stored in an alkaline state without performing the neutralization step, the derivative is colored reddish brown. The mixing of such a colored component is not desired since it may be mixed into pharmaceuticals as an impurity.

Furthermore, at the time when the polyalkylene glycol derivative is isolated, it is necessary to remove the ether solvent used as a diluting solvent. For example, diglyme is used as an ether solvent in Examples and, after the diglyme is re-precipitated into heptane and filtration under reduced pressure and washing with fresh heptane are performed, a drying step under reduced pressure is conducted. However, such a method requires a large number of steps and is vexatious and complex and the boiling point of diglyme is 160° C., so that the diglyme remaining at the final drying step is difficult to remove by drying under reduced pressure. When drying under heating at high temperature is performed for removing the diglyme, the quality of the polyalkylene glycol derivative is deteriorated. When the diglyme remains in the polyalkylene glycol derivative and mixed into a final pharmaceutical product, the pharmaceutical product is not preferred as a pharmaceutical.

Usually, a highly pure product containing a lesser amount of impurities is required as a polyalkylene glycol derivative to be used in pharmaceutical applications and thus a product containing a lesser amount of high-molecular-weight impurities such as the diol compound and remaining solvents and having less peroxide value is required. Therefore, a process for producing a polyalkylene glycol derivative having high purity and high molecular weight in more simple and convenient steps has been demanded.

An object of the invention is to provide a process for producing a polyalkylene glycol derivative having such high molecular weight and purity that the derivative can be used in pharmaceutical applications.

Means for Solving the Problems

The invention relates to a process for producing a polyalkylene glycol derivative of the formula (X):

wherein R represents a hydrocarbon group having 1 to 7 carbon atoms, a protective group of a hydroxyl group, a protective group of an amino group, a protective group of an aldehyde group, a protective group of a carboxyl group, or a protective group of a mercapto group; OA is an oxyalkylene group having 2 to 4 carbon atoms; and n is an average number of moles of the oxyalkylene group added and is 600 to 2000, Comprising the following steps (A), (B), (C), and (D):

Step (A): a step of adding 5 to 50% by mol of an alkali catalyst to a compound represented by the formula (Y):

R—OH           (Y)

wherein R represents a hydrocarbon group having 1 to 7 carbon atoms, a protective group of a hydroxyl group, a protective group of an amino group, a protective group of an aldehyde group, a protective group of a carboxyl group, or a protective group of a mercapto group, Step (B): a step of reacting an alkylene oxide having 2 to 4 carbon atoms under a condition of 50 to 130° C. until the average number of moles of the oxyalkylene group OA added reaches the range of 5 to 500 to obtain a polyalkylene glycol derivative, Step (C): a step of adding 10 to 5000% by mass of a hydrocarbon solvent to the polyalkylene glycol derivative of the step (B) to dilute it and removing remaining water by azeotropy, and Step (D): a step of reacting an alkylene oxide having 2 to 4 carbon atoms with the polyalkylene glycol derivative of the step (B) under a condition of 50 to 130° C. until the average number of moles of the oxyalkylene group OA added reaches the range of 600 to 2000.

Advantage of the Invention

According to the process of the invention, a polyalkylene glycol derivative containing a lesser amount of high-molecular-weight impurities such as the diol compound and remaining solvents and having a small peroxide value can be produced.

BRIEF DESCRIPTION OF THE DRAWINGS

FIG. 1 shows a model chromatogram of GPC.

MODE FOR CARRYING OUT THE INVENTION

In the formula (X), R represents a hydrocarbon group having 1 to 7 carbon atoms, a protective group of a hydroxyl group, a protective group of an amino group, a protective group of an aldehyde group, a protective group of a carboxyl group, or a protective group of a mercapto group.

Specific hydrocarbon groups include hydrocarbon groups such as a methyl group, an ethyl group, a propyl group, an isopropyl group, a butyl group, a t-butyl group, a pentyl group, an isopentyl group, a cycloheptyl group, a hexyl group, a 2-hexyl group, a 3-hexyl group, and a cyclohexyl group, and preferred are a methyl group and an ethyl group and further preferred is a methyl group. Preferred protective groups of a hydroxyl group include a benzyl group, a trityl group, a t-butyl group, a trimethylsilyl group, a t-butyldimethylsilyl group, a tetrahydropyran-2-yl group, a 2-methoxyethoxymethyl group, a methoxymethyl group, a 2-oxybenzylethyl group, a 2-t-butoxyethyl group, and an isopropylidene group. Preferred protective groups of an amino group include a phthaloyl group, a benzoyl group, a benzylamino group, a dibenzylamino group, a disilazane, a cyclic imido group, and the like. Preferred protective groups of an aldehyde group include acyclic acetals such as a diethylacetal group, a dimethylacetal group, a diisopropylacetal

group, and a dibenzylacetal group, and cyclic acetal groups such as 1,3-dioxolane, 1,3-dithiolane, and 1,3-ditiane. Preferred protective groups of a carboxyl group include a t-butylethyl ester group, a t-butylpropyl ester group, a benzylethyl ester group, and an orthoester group. Preferred protective groups of a mercapto group include a thioether group and a benzoylthioester group. Most preferred R groups include a methyl group, a benzyl group, a t-butyl group, a 3,3-diethoxypropyl group.

OA represents an oxyalkylene group having 2 to 4 carbon atoms. Specifically, it includes an oxyethylene group, an oxypropylene group, an oxytrimethylene group, an oxy-1-ethylethylene group, an oxy-1,2-dimethylethylene group, an oxytetramethylene group, and the like. The oxyalkylene group may be one kind or two or more kinds and may be added randomly or block-wise. In general, the fewer the carbon atoms of the alkylene group are, the higher the hydrophilicity is. The group is preferably an oxyethylene group or an oxypropylene group, more preferably an oxyethylene group.

n is an average number of moles of the oxyalkylene group added. n is 600 to 2000, preferably 800 to 2000, more preferably 900 to 2000.

The following will describe individual steps in detail.

(Step (A): a Step of Adding 5 to 50% by Mol of an Alkali Catalyst to a Compound Represented by the Formula (Y) to Form an Alcoholate)

The starting substance represented by the formula (Y) is an alcohol having R mentioned above. Examples of the alkali catalyst to be added to the compound of the formula (Y) include metal sodium, metal potassium, sodium hydride, potassium hydride, sodium methoxide, potassium t-butoxide, potassium methoxide, and the like.

The amount of the alkali catalyst to be added is 5 to 50% by mol based on 100% by mol of the compound of the formula (Y). When the amount of the alkali catalyst to be added is less than 5% by mol, the polymerization reaction rate of the alkylene oxide decreases and heat history increases, so that impurities such as compound having vinyl ether group at the end are formed. When the amount of the alkali catalyst to be added exceeds 50% by mol, the viscosity of the reaction liquid increases or the reaction liquid solidifies at the alcoholate formation reaction, so that stirring efficiency is lowered and the alcoholate formation is not accelerated. In the case where the liquid solidifies, handling tends to be difficult and the solidification causes moisture absorption. When the alcoholate has absorbed moisture, the diol compound having a double molecular weight derived from water is formed.

In general, in the case of synthesizing a polyalkylene glycol derivative having a higher molecular weight, it is necessary to charge a larger amount of the alkali catalyst. However, in the case where the handling becomes difficult, the alkali catalyst may be added on the way of the step.

In the case where metal sodium, metal potassium, sodium hydride, potassium hydride, or the like are used as the alkali catalyst, the dissolving temperature is not particularly limited but is preferably 10 to 60° C. When the temperature is lower than 10° C., the alcoholate formation is difficult to proceed and solidification occurs in some cases. In the case of occurrence of solidification, handling tends to be difficult and the solidification causes moisture absorption. When the dissolving temperature is higher than 60° C., there is a possibility that the starting material is vaporized or a side reaction takes place. The dissolving time is not particularly limited since it depends on the amount of the alkali but is preferably 1 hour to 4 days.

There is also a method for (Y) alcoholate formation by an exchange reaction using an alcoholate of a lower alcohol, such as sodium methoxide, potassium t-butoxide, or potassium methoxide, as the alkali catalyst. On this occasion, the amount of the catalyst is in the range of 5 to 50% by mol for the reason as mentioned above. With regard to the reaction temperature, the exchange reaction is preferably carried out at 60 to 100° C. On this occasion, an operation for reducing pressure may be performed so that the exchange reaction more promptly takes place. When the temperature is lower than 60° C., the exchange reaction does not proceed and an impurity obtained by addition polymerization of an alkylene oxide to the alcohol derived from the catalyst is liable to be produced as a by-product. Moreover, in the case where the temperature is higher than 100° C., there is a concern that side reactions such as a decomposition reaction take place. The reaction time is preferably 1 to 5 hours. When the reaction time is shorter than 1 hour, there is a concern that the reaction conversion rate for the alcoholate formation decreases. When the reaction time is longer than 5 hours, there is a concern that side reactions take place. When the alcoholate exchange reaction is not completely carried out, an impurity obtained by addition polymerization of an alkylene oxide to the alcohol derived from the catalyst is produced as a by-product.

The starting substance represented by the formula (Y) is desirably subjected to water removal by means of distillation, column chromatography, dehydration under reduced pressure, treatment with an adsorbent, extraction, or the like prior to the alcoholate formation.

In the case where the starting substance represented by the formula (Y) cannot be stirred at the time when it is charged into the reaction vessel since the amount is small, it may be diluted with a necessary amount of a non-polar solvent, preferably toluene or the like.

(Step (B): a Step of Reacting an Alkylene Oxide Under a Condition of 50 to 130° C. Until the Average Number of Moles Added Reaches the Range of 5 to 500)

The step B is a step of addition polymerization of an alkylene oxide to an alcoholate produced in the step (A). The reaction temperature is 50 to 130° C. When the reaction temperature is lower than 50° C., the rate of the polymerization reaction is low and heat history increases, so that the quality of the compound of the formula (X) is lowered. Moreover, when the molecular weight of the objective compound becomes high molecular weight, stirring becomes difficult owing to high viscosity. When the reaction temperature is higher than 130° C., side reactions such as vinyl etherification of an end take place and polydispersity of the objective compound is lowered, so that the product becomes heterogeneous.

The average number of moles added at the stage of the step (B) is adjusted to the range of 5 to 500 mol. More preferred is 5 to 250 mol, further preferred is 5 to 120 mol, and most preferred is 10 to 80 mol. In the case where the average number is less than 5 mol, in the following step of dilution with a hydrocarbon solvent and azeotropic removal of remaining water, the polyalkylene glycol derivative in the reaction system is vaporized at performing the step of azeotropic removal under reduced pressure. When the average number is more than 500 mol, in the following step of dilution with a hydrocarbon solvent and azeotropic removal of remaining water, the viscosity of the reaction liquid increases and the efficiency of the operation of dehydration becomes worse.

In the following step (C), dilution is performed with a hydrocarbon solvent. Depending on the volume of the vessel, the reaction mixture may be transferred into another sufficiently washed reaction vessel having a larger volume after step (B).

(Step (C): a Step of Adding 10 to 5000% by Mass of a Hydrocarbon Solvent to the Polyalkylene Glycol Derivative of the Step (B) to Dilute it and Removing Remaining Water By Azeotropy)

The step (C) is a step of performing dilution with a hydrocarbon solvent since the viscosity of the reaction liquid increases at the time when the polyalkylene glycol derivative produced in the step (B) is converted into a high-molecular-weight one and further removing water in the reaction system by azeotropy.

The hydrocarbon solvent used for the dilution is a solvent of a compound composed of carbon and hydrogen. The hydrocarbon solvent is not particularly limited so long as it is a solvent capable of forming an azeotrope with water but preferably has a boiling point of 80 to 140. The hydrocarbon solvent is particularly preferably an aromatic hydrocarbon such as toluene, xylene, benzene, or ethylbenzene, or an alicyclic hydrocarbon such as cyclohexane, methylcyclohexane, or ethylcyclohexane. Particularly preferred is toluene.

Based on 100% by mass of the polyalkylene glycol derivative in the reaction system obtained in the step (B), the hydrocarbon solvent is added in a ratio of 10 to 5000% by mass to dilute the derivative. When the amount is lower than 10% by mass, the viscosity of the reaction liquid increases as the reaction proceeds and the molecular weight increases, so that stirring becomes difficult at that time. When the amount is more than 5000% by mass, the concentration of the polyalkylene glycol derivative in the reaction system lowers and the reaction proceeds slowly. As a result, heat history increases and side reactions such as vinyl etherification take place, so that polydispersity of the objective compound is deteriorated and the product becomes heterogeneous. Preferred dilution range is a ratio of 50 to 4000% by mass and further preferred range is a ratio of 100 to 3000% by mass.

After the polyalkylene glycol derivative is diluted with the hydrocarbon solvent, a minute amount of water in the reaction system is removed by azeotropy. The evaporation conditions are not particularly limited and reduced pressure is also possible so long as water can be removed by azeotropy. The evaporation temperature is preferably 70 to 130° C. When the temperature is lower than 70° C., there is a concern that dehydration is not completely performed. When the temperature is higher than 130° C., there is a concern that vinyl etherification of an alcoholate end takes place. The evaporation time is preferably 1 hour to 10 hours although it depends on the amount to be evaporated. When the time is less than 1 hour, there is a concern that dehydration is insufficient. When the time is longer than 10 hours, there is a concern that side reactions take place. Usually, the amount to be evaporated is preferably in the range of 1 to 50% by mass based on the amount charged. In the case where the azeotropic removal is insufficient and water remains, a new impurity, the diol compound, is formed.

(Step (D): a Step of Reacting an Alkylene Oxide Under a Condition of 50 to 130° C. Until the Average Number n of Moles Added Reaches 600 to 2000)

The step (D) is a step of addition polymerization of an alkylene oxide to increase the molecular weight as in the step (B). The reaction temperature is 50 to 130° C. When the reaction temperature is lower than 50° C., the rate of the polymerization reaction is low and heat history increases, so that the quality of the compound of the formula (X) is lowered. Moreover, when the molecular weight of the objective compound becomes high molecular weight, stirring becomes difficult owing to high viscosity. When the reaction temperature is higher than 130° C., side reactions such as vinyl etherification of an end takes place and polydispersity of the objective compound is lowered, so that the product becomes heterogeneous.

The average number n of moles added is preferably in the range of 600 to 2000 mol since the circulation in blood is enhanced in a high-molecular-weight compound at formulation into a pharmaceutical agent. More preferred is in the range of 800 to 2000 mol, and further preferred is 900 to 2000 mol.

Moreover, when the average number of moles of the alkylene oxide added obtained at the stage of the step (B) is taken as n' and the average number of moles of the alkylene oxide added obtained at the stage of the step (D) is taken as n, n'/n is preferably 0.003 to 0.8. When n'/n is 0.8 or less, the timing of dilution is not delayed, so that the viscosity of the reaction liquid does not increase and the efficiency of the azeotropic dehydration can be enhanced. By adjusting n'/n to 0.003 or more, the timing of dilution is not too fast, so that the polyalkylene glycol derivative in the reaction system is prevented from vaporizing. Further preferred n'/n is 0.01 to 0.7 and most preferred n'/n is 0.02 to 0.65.

After the step (D) is completed, the polyalkylene glycol derivative can be isolated via the following step (E).

(Step (E): a Step of Removing the Hydrocarbon Solvent after Neutralization Under a Nitrogen Atmosphere and Isolating the Polyalkylene Glycol Derivative)

In the step (E), after the reaction liquid is neutralized with an acid, the hydrocarbon solvent used for dilution is removed. The acid to be used for neutralization is not particularly limited but is preferably hydrochloric acid or phosphoric acid, particularly preferably phosphoric acid. The pH at neutralization is preferably in the range of 6 to 8. When the pH is lower than 6, there is a case where oxidative degradation is apt to occur. When the pH is higher than 8, the objective compound is apt to be colored. It is not preferred to mix a colored component into pharmaceuticals.

The method of removing the hydrocarbon solvent is not particularly limited but is preferably a method by evaporation under reduced pressure or a method by re-precipitation.

In the method by evaporation under reduced pressure, the evaporation temperature is preferably 70 to 130° C. although it depends on the diluting solvent used. Furthermore, by reducing the pressure in the system, the hydrocarbon solvent can be easily removed. Moreover, in the method by re-precipitation, by mixing the reaction liquid, which have been diluted with the hydrocarbon solvent, with heptane, hexane, or the like that is a poor solvent of the polyalkylene glycol derivative, it becomes possible to crystallize the polyalkylene glycol derivative and the resulting crystals can be isolated by filtration and drying.

EXAMPLES

The following will describe the invention further specifically with reference to Examples.

In this regard, gel permeation chromatography (GPC) was used for analysis of compounds in examples.

As a GPC system, LC10AVP was used and measurement was performed under the following conditions.

Developing solvent: DMF
Flow rate: 0.7 ml/min
Column: PLgel MIXED-D two columns
Column temperature: 65° C.
Detector: RI (manufactured by shodex)
Amount of sample: 1 mg/mL, 100 μL A model diagram of chromatogram obtained by GPC measurement is shown in FIG. 1. In GPC, among peaks except for peaks derived from the developing solvent used and the like and pseudo peaks owing to fluctuation of a baseline derived from the columns and apparatus used, a peak showing a maximum point on refractive index is taken as a main peak, a linear line joining from an elution start point A to an elution end point C on the chromatogram is taken as a baseline, and the total peak area from the baseline upward is taken as Area-A. The elution of a high-molecular-weight impurity starts from the elution start point A and, after reaching the peak top, the elution curve goes downward. An inflection point between the peak top of the high-molecular-weight impurity and the peak top of a next appearing main peak is taken as B. Subsequently, elution of an objective compound that is a main component starts and, after reaching the peak top, the elution finishes at C. An intersection point of a line drawn from B to the baseline vertically is taken as D and an area of the portion surrounded by A, B, and D from the baseline upward is taken as Area-H. The high-molecular-weight impurity (%) is shown by (Area-H/Area-A)×100.

Moreover, the number n in Examples is a theoretical value calculated from peak-top molecular weight.

Example 1

Washing and Drying of Autoclave

Into an autoclave having a volume of 3 L and equipped with a nitrogen gas-inlet tube, an injection tube, a stirrer, and a thermometer was charged 1.5 L of dehydrated toluene, followed by washing under reflux. Lines such as a transfer line and the injection tube were also washed with toluene. After washing, toluene was discarded and sufficiently removed from the lines and then the whole was dried at 0.7 kPa or less and 120±10° C. for 5 hours. After drying, the temperature of the autoclave was lowered to 20° C. under pressurization with nitrogen.

An autoclave having a volume of 150 L was also washed with 75 L of dehydrated toluene under reflux and removal from the lines and drying were performed in the same manner as described above.

(Step A)

To a 2 L four-necked flask fitted with a stirring apparatus, a rectification tube, a thermometer, and a Liebig condenser were added 1002.1 g of dehydrated methanol (manufactured by Kanto Chemical Co. Inc.) and 5 g of calcium hydride (manufactured by Kanto Chemical Co. Inc.). After 140 g of first fraction was collected under normal pressure, 600 g of main fraction was collected. As instruments used in the present distillation operation, those fully dried were used.

A fully dried four-necked flask was fitted with a stirring apparatus, a thermometer, and a nitrogen-inlet tube, and 280 g (8.75 mol) of the resulting main fraction methanol (a compound of the formula (Y)) was added thereto under a nitrogen atmosphere. Subsequently, 44.0 g (1.91 mol: 22% by mol) of metal sodium was added thereto and the whole was stirred with introducing nitrogen until metal sodium was completely dissolved. The weight of the resulting sodium methoxide/methanol solution was measured and a loss as vaporized methanol was compensated with the main fraction methanol to adjust the concentration.

(Step B)

Into a dried 3 L autoclave was charged 32.4 g of the resulting sodium methoxide/methanol solution. After the temperature was elevated to 100° C., 1.74 kg of ethylene oxide was introduced with pressure in the range of 100±5° C. and 0.4 MPa or less and, after the total amount was introduced with pressure, the reaction was continued for another 1 hour. After unreacted ethylene oxide gas was removed under reduced pressure, the reaction liquid was transferred into a dried 150 L autoclave. At the transfer, 1 g of the reaction liquid was sampled and, when the molecular weight was measured on GPC, the peak top molecular weight was found to be 1902. The average number n' of moles of ethylene oxide added at this stage is 42.5.

(Step C)

After the transfer, 40 kg of toluene (a hydrocarbon solvent) was added to the autoclave and the whole was refluxed under normal pressure to take out 5 kg of toluene. The amount of toluene added was 2410% by mass based on 100% by mass of the polyoxyalkylene derivative obtained in the step B.

(Step D)

Subsequently, after the temperature was elevated to 120° C., 37.0 kg of ethylene oxide was introduced with pressure in the range of 120±5° C. and 0.45 MPa or less and, after the total amount was introduced with pressure, the reaction was continued for another 4 hours.

(Step E)

After cooling to 90° C., unreacted ethylene oxide was removed by nitrogen bubbling and neutralization was performed with adding 11.0 g of phosphoric acid. Then, 50 g of the reaction liquid was collected and toluene was evaporated on an evaporator using a water bath at 80° C. to obtain methoxypolyethylene glycol (P1).

When analysis was performed, the following data were obtained.

$$CH_3(OCH_2CH_2)_nOH \quad (P1)$$

GPC Analysis:
Number-average molecular weight (Mn): 41696
Weight-average molecular weight (Mw): 43288
n=971
Polydispersity (Mw/Mn): 1.038
Peak top molecular weight (Mp): 42756
High-molecular-weight impurity: 3.09%
n'/n=0.044

Thus, by a simple and convenient method of performing azeotropic dehydration using toluene as a diluting solvent, a high-molecular-weight polyalkylene glycol derivative containing reduced high-molecular-weight impurity could be obtained.

Comparative Example 1

Washing and Drying of Autoclave

Washing and drying operations of an autoclave were performed in the same manner as in Example 1.

(Step A)

The operations are the same as in Example 1.

(Step B)

Into a dried 3 L autoclave was charged 33.1 g of the sodium methoxide/methanol solution prepared in Example 1. After the temperature was elevated to 100° C., 1.74 kg of ethylene oxide was introduced with pressure in the range of 100±5° C. and 0.4 MPa or less and, after the total amount was introduced with pressure, the reaction was continued for another 1 hour. After unreacted ethylene oxide gas was removed under reduced pressure, the reaction liquid was transferred into a dried 150 L autoclave. At the transfer, 1 g of the reaction liquid was sampled and, when the molecular weight was measured on GPC, the peak top molecular weight was found to be 1951. The average number n' of moles of ethylene oxide added is 43.6.

(Step D)

After the transfer, the temperature was elevated to 120° C. without adding toluene. Then, the introduction of 33.4 kg of ethylene oxide with pressure was started in the range of 120±5° C. and 0.45 MPa or less. Namely, the step (C) was not carried out.

As a result, stirring became difficult at the time point that 21.7 kg was introduced with pressure and the reaction was stopped. Since viscosity increases as the molecular weight of the polyalkylene glycol derivative increases, it was found that dilution with a hydrocarbon solvent is necessary for obtaining a high-molecular-weight polyalkylene glycol derivative.

Comparative Example 2

In the present example, it was attempted to remove water in the reaction system by adding toluene into the reaction system beforehand at the stage of the step A to dilute the reaction mixture.

Specifically, washing and drying steps of an autoclave were performed in the same manner as in Example 1.

Into a dried 5 L autoclave was charged 4.8 g of the sodium methoxide/methanol solution obtained by preparation in the same manner as in Example 1. Subsequently, 1.6 kg of toluene was added thereto and the whole was refluxed under normal temperature to take out 0.32 kg of toluene.

Subsequently, after the temperature was elevated to 120° C., 1.35 kg of ethylene oxide was introduced with pressure in the range of 120±5° C. and 0.45 MPa or less and, after the total amount was introduced with pressure, the reaction was continued for another 8 hours. After cooling to 90° C., unreacted ethylene oxide was removed by nitrogen bubbling and neutralization was performed with adding 1.8 g of phosphoric acid.

Then, 20 g of the reaction liquid was collected and toluene was evaporated on an evaporator using a water bath at 80° C. to obtain methoxypolyethylene glycol. When analysis was performed, the following data were obtained.

GPC Analysis:
Number-average molecular weight (Mn): 37822
Weight-average molecular weight (Mw): 39986
Polydispersity (Mw/Mn): 1.057
Peak top molecular weight (Mp): 39132
High-molecular-weight impurities: 9.19%
n=889

Thus, as a result of precedent dilution with a hydrocarbon solvent and performance of dehydration operation before charging of ethylene oxide, an increase in a dimer that is a high-molecular-weight impurity resulted in.

Comparative Example 3

In the present example, it was attempted to dilute the reaction mixture by adding diglyme into the reaction system beforehand at the stage of the step A.

Into a dried 5 L autoclave were charged 6.0 g of diethylene glycol monomethyl ether (manufactured by Kanto Chemical Co. Inc.) sufficiently dried using molecular sieve 4A 1/16 (manufactured by Kanto Chemical Co. Inc.), 1504 g of diglyme (manufactured by Kanto Chemical Co. Inc.) sufficiently dried using molecular sieve 4A 1/16 (manufactured by Kanto Chemical Co. Inc.), and 0.92 g of potassium hydride (manufactured by Kanto Chemical Co. Inc.) dispersed in oil under a nitrogen atmosphere.

After stirring at room temperature for 30 minutes, the whole was sufficiently subjected to nitrogen substitution and pressurized to 0.08 MPa with nitrogen. After the temperature was elevated to 100° C., 1.03 kg of ethylene oxide was introduced with pressure in the range of 100±5° C. and 0.45 MPa or less and, after the total amount was introduced with pressure, the reaction was continued for another 2 hours. After cooling to 90° C., unreacted ethylene oxide was removed by nitrogen bubbling.

Then, 20 g of the reaction liquid was collected, the solution heated to 50° C. was neutralized under stirring with acetic acid, and 30 g of heptane was added, thereby performing crystallization. Crystals were filtrated and dried. When the crystals were analyzed, the following data were obtained.

GPC Analysis:
Number-average molecular weight (Mn): 16155
Weight-average molecular weight (Mw): 17074
Polydispersity (Mw/Mn): 1.057
Peak top molecular weight (Mp): 15519
High-molecular-weight impurity: 16.85%

Thus, in the case where the dehydration operation of the reaction liquid in the autoclave was not performed, a dimer that is a high-molecular-weight impurity was formed in a large amount even when the reaction mixture was diluted with diglyme beforehand.

Example 2

In an eggplant-shaped flask was placed 20 g of the reaction liquid (pure content of methoxypolyethylene glycol: 50%) after neutralization with phosphoric acid obtained in Example 1, and 30 g of toluene was added thereto to form a 20% by mass solution, followed by stirring at 80° C. for 7 hours. Then, 5 g of the solution was accurately weighed into a 50 ml screw tube. Separately, a mixed solution of 12 ml of chloroform, 18 ml of acetic acid, and 0.5 ml of an aqueous saturated potassium iodide solution was prepared and added to each screw tube. After stirring for 1 minute, the tube was allowed to stand at a dark place for 5 minutes and then titration was performed with a 0.01 mol sodium thiosulfate solution (factor=1.006). As a result, the peroxide value was found to be 0.371.

Comparative Example 4

A diglyme solution of methoxypolyethylene glycol obtained by the method of Comparative Example 3 was collected and, after neutralization with acetic acid, was adjusted to 20% by mass with diglyme. The solution was stirred at 80° C. for 7 hours in the same manner as in Example 2. When the peroxide value of the solution was measured in the same manner as in Example 2, the value was found to be 0.598. It was found that the peroxide value of the polyethylene glycol derivative solution produced using an ether solvent such as diglyme becomes high.

TABLE 1

|  | Example 2 | Comparative Example 4 |
|---|---|---|
| Peroxide value | 0.371 | 0.598 |

Example 3

Washing and Drying of Autoclave

Washing and drying operations of an autoclave were performed in the same manner as in Example 1.

(Step A)

Into a dried autoclave were added 140.4 g (1.30 mol) of benzyl alcohol (manufactured by Kanto Chemical Co. Inc.) and 47.7 g (0.248 mol: 19% by mol) of a 28% methanol solution of sodium methylate (trade name: SM-28) (manufactured by Shoji Sangyo K.K.), followed by sufficient nitrogen substitution.

After the nitrogen substitution, stirring was started, the temperature was elevated to 70° C., and methanol was removed with introducing a small amount of nitrogen while maintaining vacuum conditions of 70±5° C. and 6.6 kPa or less for 5 hours.

(Step B)

After the resulting reaction liquid was heated to 100° C., 1.27 kg of ethylene oxide was introduced with pressure in the range of 100±5° C. and 0.4 MPa or less and, after the total amount was introduced with pressure, the reaction was continued for another 1 hour. After unreacted ethylene oxide gas was removed under reduced pressure, the reaction liquid was transferred into a dried 150 L autoclave.

After the transfer, the reaction liquid was heated to 120° C., 25.5 kg of ethylene oxide was introduced with pressure in the range of 120±5° C. and 0.45 MPa or less. After the total amount was introduced with pressure, the reaction was continued for another 2 hours. After cooling to 90° C., unreacted ethylene oxide was removed by nitrogen bubbling.

Then, 2 g of the reaction liquid was sampled and, when the molecular weight was measured on GPC, the peak top molecular weight was found to be 20220. The average number n' of moles of ethylene oxide added at this stage is 457.

(Step C)

To an autoclave was added 32 kg of toluene (a hydrocarbon solvent), and the whole was refluxed under normal pressure to take out 13 kg of toluene. The amount of toluene added was 120% by mass based on 100% by mass of the polyoxyalkylene derivative obtained in the step B.

(Step D)

Subsequently, after the temperature was elevated to 120° C., 16.5 kg of ethylene oxide was introduced with pressure in the range of 120±5° C. and 0.45 MPa or less and, after the total amount was introduced with pressure, the reaction was continued for another 2 hours.

(Step E)

After cooling to 90° C., unreacted ethylene oxide was removed by nitrogen bubbling and neutralization was performed with adding 14.0 g of phosphoric acid. Then, 20 g of the reaction liquid was collected and toluene was evaporated on an evaporator using a water bath at 80° C. to obtain polyoxyethylene monobenzyl ether (P2).

When analysis was performed, the following data were obtained.

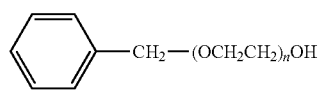

(P2)

GPC Analysis:
Number-average molecular weight (Mn): 29306
Weight-average molecular weight (Mw): 30864
n=734
Polydispersity (Mw/Mn): 1.056
Peak top molecular weight (Mp): 32411
High-molecular-weight impurity: 0.60%
Low-molecular-weight impurity: 4.30%

The high-molecular-weight impurity is a diol compound derived from water present in a minute amount at the start of the reaction and the low-molecular-weight impurity is a diol compound derived from water remaining in a minute amount at the dehydration.

n'/n=0.623

Example 4

Washing and Drying of Autoclave

Washing and drying operations of an autoclave were performed in the same manner as in Example 1.

(Step A)

A fully dried four-necked flask was fitted with a stirring apparatus, a thermometer, and a nitrogen-inlet tube, then 163.0 g (1.10 mol) of 3,3-diethoxy-1-propanol (manufactured by Sigma-Aldrich Japan Inc.) and 4.9 g (0.213 mol: 19% by mol) of sodium (manufactured by Kanto Chemical Co. Inc.) were added thereto, and the whole was stirred with introducing nitrogen until metal sodium was completely dissolved. The resulting reaction solution was charged into a dried 3 L autoclave under a nitrogen atmosphere, and nitrogen substitution was performed.

(Step B)

After the reaction liquid was heated to 100° C., 1.2 kg of ethylene oxide was introduced with pressure in the range of 100±5° C. and 0.4 MPa or less and, after the total amount was introduced with pressure, the reaction was continued for another 1 hour. After unreacted ethylene oxide gas was removed under reduced pressure, the reaction liquid was transferred into a dried 150 L autoclave. At the transfer, 1 g of the reaction liquid was sampled and, when the molecular weight was measured on GPC, the peak top molecular weight was found to be 1220. The average number n' of moles of ethylene oxide added at this stage is 24.4.

(Step C)

After the transfer, 35 kg of toluene (a hydrocarbon solvent) was added to the autoclave and the whole was refluxed under normal pressure to take out 10 kg of toluene. The amount of toluene added was 2600% by mass based on 100% by mass of the polyoxyalkylene derivative obtained in the step B.

(Step D)

Subsequently, after the temperature was elevated to 120° C., 34.5 kg of ethylene oxide was introduced with pressure in the range of 120±5° C. and 0.45 MPa or less and, after the total amount was introduced with pressure, the reaction was continued for another 2 hours.

(Step E)

After cooling to 90° C., unreacted ethylene oxide was removed by nitrogen bubbling and neutralization was performed with adding 13.0 g of phosphoric acid. Then, 10 g of the reaction liquid was collected and toluene was evaporated on an evaporator using a water bath at 80° C. to obtain α-(3,3-diethoxypropyl)-ω-hydroxypolyoxyethylene (P3).

When analysis was performed, the following data were obtained.

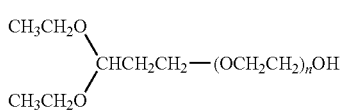
(P3)

GPC Analysis:
Number-average molecular weight (Mn): 30252
Weight-average molecular weight (Mw): 31910
n=725
Polydispersity (Mw/Mn): 1.055
Peak top molecular weight (Mp): 32051
High-molecular-weight impurity: 2.78%
n'/n=0.034

Example 5

Washing and Drying of Autoclave

Washing and drying operations of an autoclave were performed in the same manner as in Example 1.
(Step A)
Into a dried autoclave were added 118.2 g (1.0 mol) of ethylene glycol mono-tertiary butyl ether (trade name: SWA-SOLVE ETB) (manufactured by Maruzen Petrochemical Co., Ltd.) and 17.3 g (0.154 mol: 15% by mol) of potassium tertiary butoxide (manufactured by Kanto Chemical Co. Inc.), followed by sufficient nitrogen substitution.
(Step B)
After the reaction liquid was heated to 100° C., 1.8 kg of ethylene oxide was introduced with pressure in the range of 100±5° C. and 0.4 MPa or less and, after the total amount was introduced with pressure, the reaction was continued for another 2 hours. After unreacted ethylene oxide gas and unreacted tertiary butanol were removed under reduced pressure, the reaction liquid was transferred into a dried 150 L autoclave. At the transfer, 1 g of the reaction liquid was sampled and, when the molecular weight was measured on GPC, the peak top molecular weight was found to be 1895. The average number n' of moles of ethylene oxide added at this stage is 41.3.
(Step C)
After the transfer, 40 kg of toluene (a hydrocarbon solvent) was added to the autoclave and the whole was refluxed under normal pressure to take out 5 kg of toluene. The amount of toluene added was 2100% by mass based on 100% by mass of the polyoxyalkylene derivative obtained in the step B.
(Step D)
Subsequently, after the temperature was elevated to 120° C., 41.0 kg of ethylene oxide was introduced with pressure in the range of 120±5° C. and 0.45 MPa or less and, after the total amount was introduced with pressure, the reaction was continued for another 2 hours.
(Step E)
After cooling to 90° C., unreacted ethylene oxide was removed by nitrogen bubbling and neutralization was performed with adding 9.0 g of phosphoric acid. Then, 10 g of the reaction liquid was collected and toluene was evaporated on an evaporator using a water bath at 80° C. to obtain α-(tertiary butyl)-ω-hydroxypolyoxyethylene (P4).

When analysis was performed, the following data were obtained.

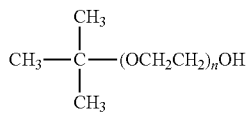
(P4)

GPC Analysis:
Number-average molecular weight (Mn): 41050
Weight-average molecular weight (Mw): 42864
n=955
Polydispersity (Mw/Mn): 1.044
Peak top molecular weight (Mp): 42101
High-molecular-weight impurities: 3.21%
n'/n=0.043

Example 6

Washing and Drying of Autoclave

Washing and drying operations of an autoclave were performed in the same manner as in Example 1.
(Step A)
The operations were performed in the same manner as in Example 1.
(Step B)
Into a dried 3 L autoclave was charged 16.0 g of the sodium methoxide/methanol solution obtained in the step A of Example 1. After the temperature was elevated to 100° C., 1.05 kg of ethylene oxide was introduced with pressure in the range of 100±5° C. and 0.4 MPa or less and, after the total amount was introduced with pressure, the reaction was continued for another 1 hour. Unreacted ethylene oxide gas was removed under reduced pressure. Thereafter, 21.0 g (0.109 mol: 19% by mol, total 0.218 mol: 38% by mol) of a 28% methanol solution of sodium methylate (trade name: SM-28) (manufactured by Shoji Sangyo K.K.) was added thereto, followed by sufficient nitrogen substitution.
After the nitrogen substitution, stirring was started, the temperature was elevated to 70° C., and methanol was removed with introducing a small amount of nitrogen while maintaining vacuum conditions of 70±5° C. and 6.6 kPa or less for 5 hours. Thereafter, the reaction liquid was transferred into a dried 150 L autoclave. At the transfer, 1 g of the reaction liquid was sampled and, when the molecular weight was measured on GPC, the peak top molecular weight was found to be 2107.
After the transfer, the temperature was elevated to 120° C., 2.0 kg of ethylene oxide was introduced with pressure in the range of 120±5° C. and 0.45 MPa or less and, after the total amount was introduced with pressure, the reaction was continued for another 2 hours.
Then, 1 g of the reaction liquid was sampled and, when the molecular weight was measured on GPC, the peak top molecular weight was found to be 6036. The average number n' of moles of ethylene oxide added at this stage is 136.5.
(Step C)
Thereafter, 40 kg of toluene (a hydrocarbon solvent) was added to the autoclave, and the whole was refluxed under normal pressure to take out 9 kg of toluene. The amount of toluene added was 1330% by mass based on 100% by mass of the polyoxyalkylene derivative obtained in the step B.

(Step D)

Subsequently, after the temperature was elevated to 120° C., 29.0 kg of ethylene oxide was introduced with pressure in the range of 120±5° C. and 0.45 MPa or less and, after the total amount was introduced with pressure, the reaction was continued for another 10 hours.

(Step E)

After cooling to 90° C., unreacted ethylene oxide was removed by nitrogen bubbling and neutralization was performed with adding 4.0 g of phosphoric acid. Then, 50 g of the reaction liquid was collected and toluene was evaporated on an evaporator using a water bath at 80° C. to obtain methoxypolyethylene glycol (P1).

When analysis was performed, the following data were obtained.

GPC Analysis:
Number-average molecular weight (Mn): 61373
Weight-average molecular weight (Mw): 66053
n=1408
Polydispersity (Mw/Mn): 1.076
Peak top molecular weight (Mp): 61984
High-molecular-weight impurities: 5.75%
n'/n=0.097

While the invention has been described in detail with reference to specific examples thereof, it will be apparent to one skilled in the art that various changes and modifications can be made therein without departing from the spirit and scope thereof.

The present application is based on Japanese Patent Application No. 2008-288781 filed on Nov. 11, 2008, and the entire contents are incorporated herein by reference. Also, all the references are incorporated as a whole.

The invention claimed is:

1. A process for producing a polyalkylene glycol derivative of the formula (X):

$$R-(OA)_n OH \quad\quad (X)$$

wherein R represents a hydrocarbon group having 1 to 7 carbon atoms, a protective group of a hydroxyl group, a protective group of an amino group, a protective group of an aldehyde group, a protective group of a carboxyl group or a protective group of a mercapto group; OA is an oxyalkylene group having 2 to 4 carbon atoms; and n is an average number of moles of the oxyalkylene group added and is 600 to 2000, the process comprising the following steps (A), (B), (C) and (D):

Step (A): a step of adding 5 to 50% by mol of an alkali catalyst to a compound represented by the formula (Y):

$$R-OH \quad\quad (Y)$$

wherein R represents a hydrocarbon group having 1 to 7 carbon atoms, a protective group of a hydroxyl group, a protective group of an amino group, a protective group of an aldehyde group, a protective group of a carboxyl group or a protective group of a mercapto group, Step (B): a step of reacting an alkylene oxide having 2 to 4 carbon atoms under a condition of 50 to 130° C. until an average number of moles of the oxyalkylene group OA added reaches a range of 5 to 500 to obtain a polyalkylene glycol derivative, Step (C): a step of adding 10 to 5000% by mass of a hydrocarbon solvent to the polyalkylene glycol derivative of the step (B) to dilute it and removing remaining water by azeotropy, and Step (D): a step of reacting an alkylene oxide having 2 to 4 carbon atoms with the polyalkylene glycol derivative of the step (B) under a condition of 50 to 130° C. until an average number of moles of the oxyalkylene group OA added reaches a range of 600 to 2000.

2. The process according to claim 1, wherein the oxyalkylene group is an oxyethylene group.

3. The process according to claim 1, wherein n in the formula (X) is 900 to 2000.

4. The process according to claim 1, wherein R in the formula (X) is a hydrocarbon group having 1 to 7 carbon atoms.

5. The process according to claim 4, wherein R in the formula (X) is a methyl group.

6. The process according to claim 1, wherein R in the formula (X) is a protective group of a hydroxyl group, a protective group of an amino group, a protective group of an aldehyde group, a protective group of a carboxyl group, or a protective group of a mercapto group.

7. The process according to claim 2, wherein n in the formula (X) is 900 to 2000.

8. The process according to claim 2, wherein R in the formula (X) is a hydrocarbon group having 1 to 7 carbon atoms.

9. The process according to claim 3, wherein R in the formula (X) is a hydrocarbon group having 1 to 7 carbon atoms.

10. The process according to claim 7, wherein R in the formula (X) is a hydrocarbon group having 1 to 7 carbon atoms.

11. The process according to claim 8, wherein R in the formula (X) is a methyl group.

12. The process according to claim 9, wherein R in the formula (X) is a methyl group.

13. The process according to claim 10, wherein R in the formula (X) is a methyl group.

14. The process according to claim 2, wherein R in the formula (X) is a protective group of a hydroxyl group, a protective group of an amino group, a protective group of an aldehyde group, a protective group of a carboxyl group, or a protective group of a mercapto group.

15. The process according to claim 3, wherein R in the formula (X) is a protective group of a hydroxyl group, a protective group of an amino group, a protective group of an aldehyde group, a protective group of a carboxyl group, or a protective group of a mercapto group.

16. The process according to claim 7, wherein R in the formula (X) is a protective group of a hydroxyl group, a protective group of an amino group, a protective group of an aldehyde group, a protective group of a carboxyl group, or a protective group of a mercapto group.

* * * * *